(12) United States Patent
Isberg

(10) Patent No.: US 8,218,779 B2
(45) Date of Patent: Jul. 10, 2012

(54) PORTABLE COMMUNICATION DEVICE AND A METHOD OF PROCESSING SIGNALS THEREIN

(75) Inventor: Peter Isberg, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 413 days.

(21) Appl. No.: 12/485,959

(22) Filed: Jun. 17, 2009

(65) Prior Publication Data

US 2010/0322430 A1 Dec. 23, 2010

(51) Int. Cl.
*H04R 29/00* (2006.01)
*H04R 1/10* (2006.01)
*H04R 25/00* (2006.01)
*G10K 11/16* (2006.01)

(52) U.S. Cl. .............. 381/58; 381/59; 381/60; 381/74; 381/317; 381/318; 381/71.6

(58) Field of Classification Search .............. 381/58, 381/71.6, 71.11, 72, 74, 317, 318
See application file for complete search history.

(56) References Cited

U.S. PATENT DOCUMENTS

| | | |
|---|---|---|
| 2003/0108209 A1 | 6/2003 | McIntosh |
| 2004/0184623 A1 | 9/2004 | Johannsen et al. |
| 2004/0196992 A1 | 10/2004 | Ryan |

FOREIGN PATENT DOCUMENTS

| | | |
|---|---|---|
| EP | 1 523 218 A1 | 4/2005 |
| WO | WO 2008/096125 A2 | 8/2008 |
| WO | WO 2008/099137 A1 | 8/2008 |
| WO | WO 2010/014663 A2 | 2/2010 |

OTHER PUBLICATIONS

International Search Report, corresponding to PCT/EP2009/066792, mailed on Feb. 26, 2010.
Written Opinion, corresponding to PCT/EP2009/066792, mailed on Feb. 26, 2010.

*Primary Examiner* — Devona Faulk
*Assistant Examiner* — George Monikang
(74) *Attorney, Agent, or Firm* — Renner, Otto, Boisselle & Sklar, LLP

(57) ABSTRACT

A portable communication device is disclosed. The portable communication device comprises a speaker adapted to be held to an ear of a user for conveying sound to the user, at least one sensor for sensing sound emanating from said sound conveyed to the user, and a control unit. The control unit is adapted to estimate, based on an electrical input signal supplied to an input port of the speaker and an electrical output signal received from an output port of the at least one sensor, a transfer characteristic from the input port of the speaker to the output port of the sensor. Furthermore, the control unit is adapted to estimate, based on the estimated transfer characteristic, a degree of sound leakage from the user's ear. A corresponding method is also disclosed.

19 Claims, 4 Drawing Sheets

PORTABLE COMMUNICATION DEVICE AND A METHOD OF PROCESSING SIGNALS THEREIN

TECHNICAL FIELD

The present invention relates to a portable communication device of the type having a speaker for conveying sound to an ear of a user of the device. Furthermore, the present invention relates to a method of processing signals in the portable communication device.

BACKGROUND

In portable communication devices, such as mobile phones, there is normally provided a built-in speaker for conveying sound (such as sound reproducing speech from another party in a voice-call session) to the user's ear in a so called "handset mode" (i.e. when no handsfree or headset unit is used). The speaker is adapted to be held to the user's ear in the handset mode, such that the sound generated by the speaker is adequately transferred thereto.

For a mobile phone in the handset mode, the sound characteristic in the receiving direction (i.e. as heard by the user's ear) changes with position and application force to the user's ear due to a varying leakage of sound. Normally, the more the leakage, the less low frequencies are heard. An ear speaker system can be designed to have more or less difference in sound characteristic between different amounts of leakage, which is referred to as various degrees of leak tolerance. With a low leak tolerance, the variation in sound characteristic with varying leakage is high, and vice versa.

The leak tolerance can be improved by various acoustical/mechanical design methods. However, such design methods require relatively powerful, and thus large, transducers. This is a disadvantage e.g. in terms of size, weight, and/or power consumption for the mobile phone.

One solution for leak compensation based on the electrical impedance of the speaker is disclosed in EP 1 523 218 A1.

SUMMARY

According to a first aspect, there is provided a portable communication device comprising a speaker adapted to be held to an ear of a user for conveying sound to the user, at least one sensor for sensing sound emanating from said sound conveyed to the user, and a control unit. The control unit is adapted to estimate, based on an electrical input signal supplied to an input port of the speaker and an electrical output signal received from an output port of the at least one sensor, a transfer characteristic from the input port of the speaker to the output port of the sensor. Furthermore, the control unit is adapted to estimate, based on the estimated transfer characteristic, a degree of sound leakage from the user's ear.

The portable communication device may comprise an adjustable filter for generating the electrical input signal to the speaker. The control unit may be adapted to adjust the adjustable filter based on the estimated degree of sound leakage for compensating a variation in the degree of sound leakage.

The at least one sensor may be placed such that, when the speaker is held to the user's ear, the at least one sensor is located for sensing the sound of a cavity of the user's ear.

Alternatively, the at least one sensor may be placed such that, when the speaker is held to the user's ear, the at least one sensor is located for sensing sound leaking from a cavity of the user's ear.

The control unit may be adapted to estimate a resonance frequency of the sensed sound based on the transfer characteristic and estimate said degree of leakage based on said resonance frequency.

The control unit may be adapted to estimate said transfer characteristic in the frequency domain.

The control unit may be adapted to utilize said estimated degree of leakage as an input parameter of an active noise cancellation process.

The at least one sensor may be a microphone.

According to a second aspect, there is provided a method of processing signals in a portable communication device comprising a speaker adapted to be held to an ear of a user for conveying sound to the user and at least one sensor for sensing sound emanating from said sound conveyed to the user. The method comprises estimating, based on an electrical input signal supplied to an input port of the speaker and an electrical output signal received from an output port of the at least one sensor, a transfer characteristic from the input port of the speaker to the output port of the sensor. Furthermore, the method comprises estimating, based on the estimated transfer characteristic, a degree of sound leakage from the user's ear.

The portable communication device may comprise an adjustable filter for generating the electrical input signal to the speaker, and the method may comprise adjusting the adjustable filter based on the estimated degree of sound leakage for compensating a variation in the degree of sound leakage.

The at least one sensor may be placed such that, when the speaker is held to the user's ear, the at least one sensor is located for sensing the sound of a cavity of the user's ear;

Alternatively, the at least one sensor may be placed such that, when the speaker is held to the user's ear, the at least one sensor is located for sensing sound leaking from a cavity of the user's ear.

Estimating the degree of sound leakage from the user's ear may comprise estimating a resonance frequency of the sensed sound based on the transfer characteristic and estimating the degree of leakage based on said resonance frequency.

Estimating said transfer characteristic may comprise estimating the transfer characteristic in the frequency domain.

The method may comprise utilizing said estimated degree of leakage as an input parameter of an active noise cancellation process.

The at least one sensor may be a microphone.

According to a third aspect, there is provided a computer program product comprising computer program code means for executing the method according to the second aspect when said computer program code means are run by a programmable hardware unit.

According to a fourth aspect, there is provided a computer readable medium having stored thereon a computer program product comprising computer program code means for executing the method according to the second aspect when said computer program code means are run by a programmable hardware unit.

According to a fifth aspect, there is provided a control unit for a portable communication device configured to perform the method according to the second aspect.

Further embodiments of the invention are defined in the dependent claims.

It should be emphasized that the term "comprises/comprising" when used in this specification is taken to specify the presence of stated features, integers, steps, or components, but does not preclude the presence or addition of one or more other features, integers, steps, components, or groups thereof.

BRIEF DESCRIPTION OF THE DRAWINGS

Further objects, features and advantages of embodiments of the invention will appear from the following detailed description, reference being made to the accompanying drawings, in which.

DETAILED DESCRIPTION

Figure 1A:
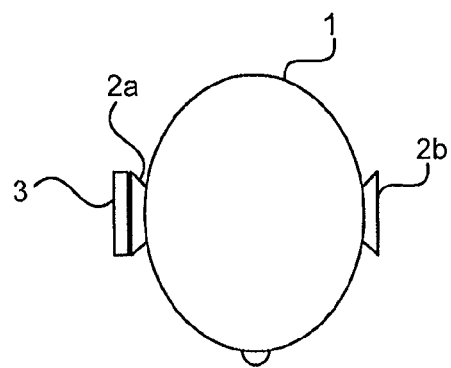
FIGS. 1a-c schematically illustrates different ways of holding a portable communication device in the proximity of an ear.
Figure 1B:
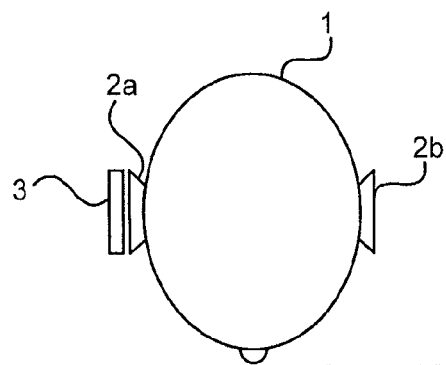
Figure 1C:
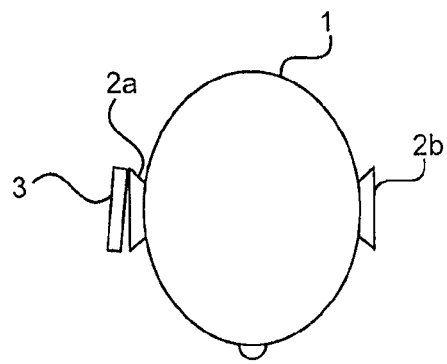

FIGS. 1a-c schematically illustrates a top view of a (human) user, showing the user's head 1 and right and left ears 2a, 2b, holding a portable communication device 3, such as a mobile phone, or cell phone, to the ear 2a. In the following, the portable communication device will 3 be referred to as the mobile phone 3, although embodiments of the present invention can be applied to other types of portable communication devices as well, such as but not limited to DECT (Digital Enhanced Cordless Telecommunications) handsets or other types of cordless telephone handsets.

The mobile phone 3 comprises a speaker 10 (FIGS. 2 and 7) for conveying sound to the user's ear 2a, e.g. during a voice-call session with another party. The speaker 10 is arranged to be held to the user's ear 2a for directing the sound into the cavity of the outer ear, sometimes referred to as the concha cavity, and further in to the auditory canal of the ear 2a, thereby conveying the sound to the user. In the situation illustrated in FIG. 1a, the user holds the mobile phone 3 close to his ear 2a. In the situation illustrated in FIG. 1b, the user instead holds the mobile phone 3 slightly further away from his ear. In the further situation illustrated in FIG. 1c, the user holds the mobile phone 3 slightly angled, such that the distance between the mobile phone 3 and the ear 2a is shorter in one end than in the other end. In the three different situations illustrated in FIGS. 1a-c, the amount of leakage of sound from the ear 2a is different. This results in that the character of the sound is perceived differently by the user in the different situations. Typically, sound leakage affects lower frequencies to a larger extent than higher frequencies, such that for a larger degree of leakage, there is normally a larger degree of attenuation of at lower frequencies perceived by the user. The three different situations illustrated in FIGS. 1a-c are, of course, only examples, and the user may hold the mobile phone 3 to his ear 2a in a multitude of other different ways, all giving rise to different degrees of leakage.

Figure 2:
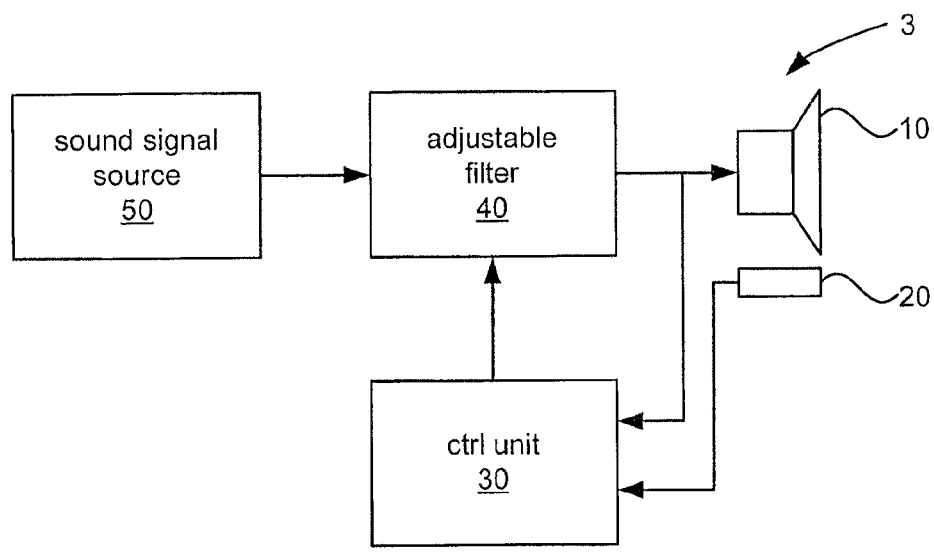
FIG. 2 is a block diagram of part of a portable communication device according to an embodiment of the present invention.

FIG. 2 is a block diagram of part of the mobile phone 3 according to an embodiment of the present invention. In this embodiment, the mobile phone 3 comprises the speaker 10, which is adapted to be held to the ear 2a of the user for conveying sound to the user. Furthermore, the mobile phone 3 comprises at least one sensor 20 for sensing sound emanating from said sound conveyed to the user. Sensing sound may include sensing sound pressure, sound pressure gradient, particle velocity, or any combination thereof. In the embodiments described in the following, the sound is sensed in terms of sound pressure, but could be sensed in other terms as exemplified in the preceding sentence. In FIG. 2, a single sensor 20 is shown. However, in some embodiments, a plurality of sensors 20 may be provided. The sensor 20, or plurality of sensors 20, may e.g. be a microphone, or plurality of microphones. For mobile phones, or similar portable communication devices, provided with active noise-cancellation (ANC) capabilities, such a sensor or sensors 20 may already be available for the purpose of enabling ANC signal processing. In such a case, this sensor or sensors 20 may be used for estimating leakage in accordance with the embodiments of the present invention described in this specification as well, whereby the hardware cost can be kept relatively low in comparison with if separate sensors are used for ANC processing and for estimating the leakage.

The sound pressure to be measured by the sensor 20 may, in some embodiments, be the sound pressure of the aforementioned cavity of the user's ear 2a. The sensor 20 may therefore be placed in the mobile phone 3 such that, when the speaker 10 is held to the user's ear, the at least one sensor 20 is located for sensing the sound pressure of the cavity of the user's ear 2a. For example, the sensor 20 may be placed on the side and in an area of the mobile phone 3 that, during normal use, faces the user's ear 2a. Such a location of the sensor 20 may also be used for so called feedback ANC systems.

Alternatively, in some embodiments, the sound pressure to be measured by the sensor 20 may be the sound pressure of sound leakage the cavity of the user's ear 2a. The sensor 20 may therefore be placed such that, when the speaker 10 is held to the user's ear, the at least one sensor 20 is located for sensing sound pressure of sound leakage from the cavity of the user's ear 2a. For example, the sensor 20 may be placed in an area of the mobile phone 3 that, during normal use, is located outside, but in proximity of, the aforementioned area facing the user's ear 2a. Such a location of the sensor 20 may also be used for so called feed-forward ANC systems.

According to the embodiment illustrated in FIG. 2, the mobile phone 3 further comprises a control unit 30. The control unit 30 is adapted to estimate a transfer characteristic from an input port of the speaker 10 to an output port of the sensor 20. The control unit 30 may be adapted to perform this estimation based on an electrical input signal supplied to the input port of the speaker 10 and an electrical output signal received from an output port of the at least one sensor 20. Furthermore, the control unit 30 is adapted to estimate, based on the estimated transfer characteristic, a degree of sound leakage from the user's ear 2a.

Furthermore, as illustrated in FIG. 2, the mobile phone 3 may comprise an adjustable filter 40 for generating the electrical input signal to the speaker. In the embodiment illustrated in FIG. 2, the mobile phone 3 comprises a sound signal source 50, which is adapted to generate a signal, representing sound to be conveyed to the user. The adjustable filter 40 is adapted to filter this signal and to supply the resulting filtered signal to the speaker 10. The sound signal source 50 may e.g. be adapted to generate the signal based on data received over a wireless communication network representing speech from another party in a voice-call session. The control unit 30 may be adapted to adjust the adjustable filter 40 based on the estimated degree of sound leakage for compensating a variation in the degree of sound leakage. For example, as mentioned above, lower frequencies are typically affected to a larger extent than higher frequencies by leakage. More generally, different frequencies may be affected (e.g. attenuated) differently due to leakage, such that the characteristic of the sound, as perceived by the user, depends on the amount of leakage. Hence, the control unit 30 may be adapted to control the adjustable filter 40 in order to counteract this effect, e.g. such that the overall characteristic of the sound is more or less the same regardless of the amount of leakage. Thereby, the leak tolerance can be improved without having to resort to mechanical or acoustical design methods that may require the use of relatively large and powerful transducers. For example, a given degree of leakage may correspond to a certain transfer characteristic, or setting, of the adjustable filter 40. Suitable transfer characteristics of the adjustable filter 40 for different degrees of leakage may e.g. be determined based on measurements for a given mobile phone 3 having associated acoustic properties.

The adjustable filter 40 may be an analog or a digital filter. In the case that the adjustable filter 40 is a digital filter, a digital-to-analog converter (DAC, not shown), which may be followed by one or more analog filters (not shown) and/or one or more amplifiers (not shown) may be placed in the signal path between the adjustable filter 40 and the speaker 10. The control unit 30 may be adapted to receive signals representing the input signal to the speaker 10 and the output signal of the sensor 20 in an analog or a digital representation. If the control unit 30 is adapted to receive the signal representing the input signal to the speaker 10 in an analog representation, this signal may be tapped off from the analog signal path to the input port of the speaker 10 and provided to the control unit 30 via another analog signal path, which may comprise elements such as analog filters and/or buffer amplifiers. If the control unit 30 is adapted to receive the signal representing the input signal to the speaker 10 in a digital representation, an analog-to-digital converter (ADC, not shown) may additionally be included for generating the signal representing the input signal to the speaker 10 in a digital representation. Alternatively, if the adjustable filter 40 is a digital filter, a digital signal tapped off from the digital signal path between the adjustable filter 40 and the aforementioned DAC may be used by the control unit 30 as a digital representation of the input signal to the speaker 10. The output signal of the sensor 20 is normally an analog signal. If the control unit 30 is adapted to receive the signal representing the output signal from the sensor 20 in an analog representation, the control unit 30 may be operatively connected to the sensor 20 via an analog signal path. The analog signal path may e.g. comprise elements such as analog filters and/or buffer amplifiers. If the control unit 30 is adapted to receive the signal representing the output signal from the sensor 20 in a digital representation, the signal path from the sensor 20 to the control unit 30 may comprise an ADC (not shown) for generating the signal representing the output signal of the sensor 20 in a digital representation.

Figure 3:
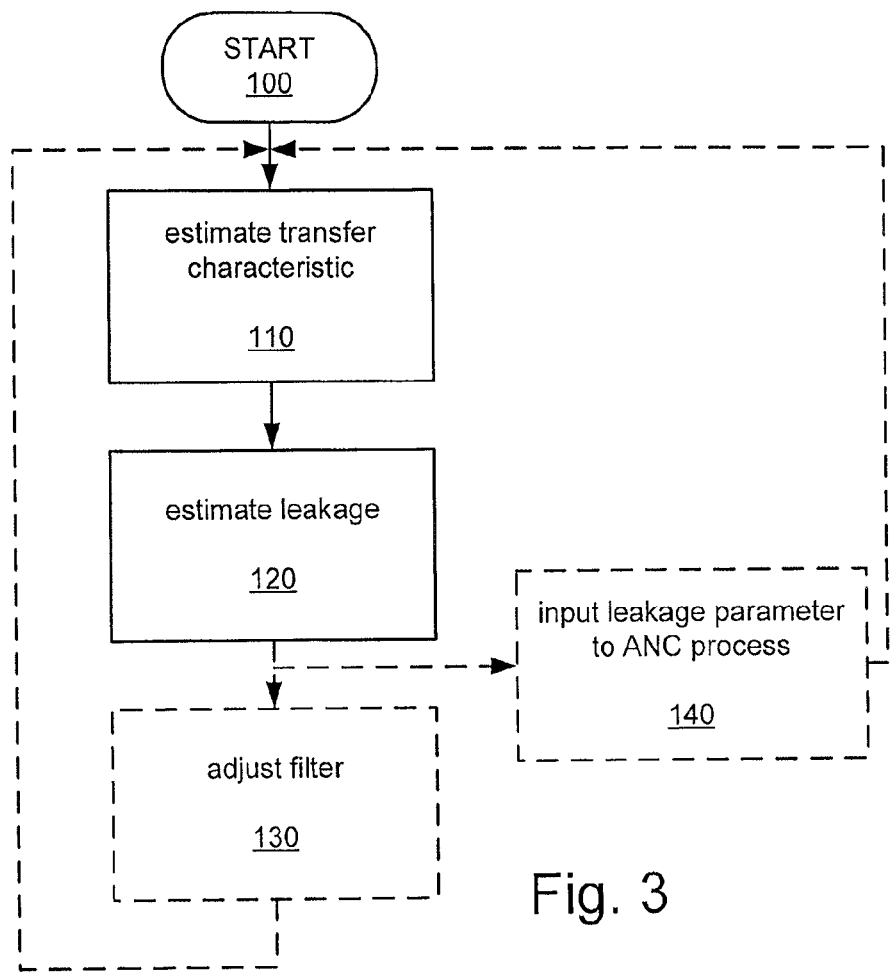
FIG. 3 is a flowchart of a method according to an embodiment of the present invention.

FIG. 3 is flowchart for a method of processing signals in the mobile phone 3 according to an embodiment of the present invention. The method may e.g. be carried out by the control unit 30 (FIG. 2).

The operation of the method is started in step 100. In step 110, the transfer characteristic from the input port of the speaker 10 to the output port of the sensor 20 is estimated based on the electrical input signal supplied to the input port of the speaker 10 and the electrical output signal received from the output port of the at least one sensor 20. Furthermore, in step 120, the degree of sound leakage from the user's ear 2a is estimated based on the transfer characteristic estimated in step 110.

As illustrated in FIG. 3, the method may comprise the step 130 of adjusting the adjustable filter 40 based on the estimated degree of sound leakage for compensating a variation in the degree of sound leakage, as has been described above. After the filter has been adjusted, the operation of the method may return to step 110, as illustrated in FIG. 3. The steps 110-130 are thereby iterated repeatedly in order to continually monitor and compensate for a varying degree of leakage. Although the steps 110-130 are illustrated in FIG. 3 as steps being performed in sequence, some or all of the steps may be continually ongoing processes being carried out in parallel. For example, at the same time that a transfer characteristic is estimated in step 110, a degree of leakage may be estimated based on a previous result (i.e. previously determined transfer characteristic) from step 110 in step 120. Furthermore, at the same time, the adjustable filter 40 may be adjusted based on a previous result (i.e. previously estimated degree of leakage) from step 120 in step 130.

Additionally or alternatively, the estimated degree of leakage may be utilized as an input to an ANC process in order to improve the noise cancellation. This is illustrated with the step 140 in FIG. 3. For example, the control unit 30 (FIG. 2) may be adapted to utilize the estimated degree of leakage as an input parameter of an ANC process. The ANC process itself may also be performed by the control unit 30.

In some embodiments, the method includes either step 130 or step 140. In alternative embodiments, the method includes both step 130 and step 140. This is elucidated in FIG. 3 with dash-dotted lines for the corresponding parts of the flowchart.

Figure 4:
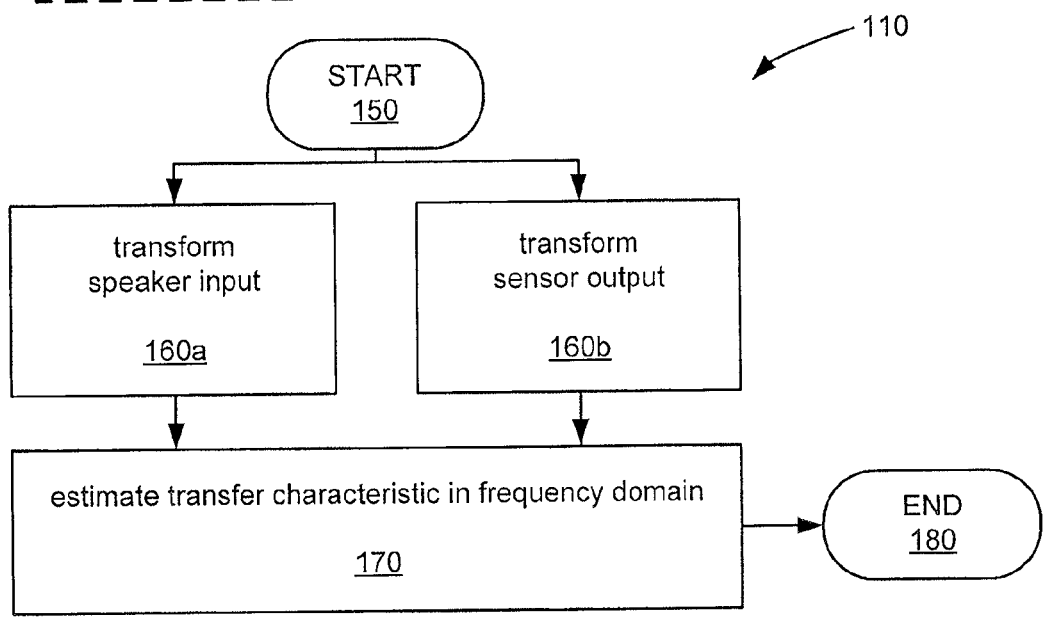
FIG. 4 is a flowchart of an embodiment of a step in the flowchart of FIG. 3.

Step 110 (FIG. 3) may comprise estimating the transfer characteristic from the input port of the speaker 10 (FIG. 2) to the output port of the sensor 20 (FIG. 2) in the frequency domain. This is illustrated in FIG. 4, which shows a flowchart for an embodiment of step 110. The operation of step 110 is, according to this embodiment, started in step 150. In step 160a, the input signal to the speaker 10 is subject to a frequency transformation. Similarly, in step 160b, the output signal from the sensor 20 is subject to a frequency transformation. The frequency transformation may e.g. be a discrete Fourier transform (DFT). The DFT may e.g. be performed using a fast Fourier transform (FFT) algorithm. The transfer characteristic from the input port of the speaker 10 to the output port of the sensor 20 is then estimated in the frequency domain in step 170 based on the frequency transformed input signal to the speaker 10 and output signal from the sensor 20. For example, the transfer characteristic may be estimated as the quotient between the transform of the output signal from the sensor 20 and the transform of the input signal to the speaker 10. The operation of step 110 is, in the embodiment illustrated in FIG. 4, ended in step 180.

In some embodiments, the control unit 30 (FIG. 2) may, accordingly, be adapted to estimate the transfer characteristic from the input port of the speaker 10 (FIG. 2) to the output port of the sensor 20 (FIG. 2) in the frequency domain. For example, the control unit 30 may be adapted to estimate the transfer characteristic in accordance with the flowchart in FIG. 4.

Figure 5:
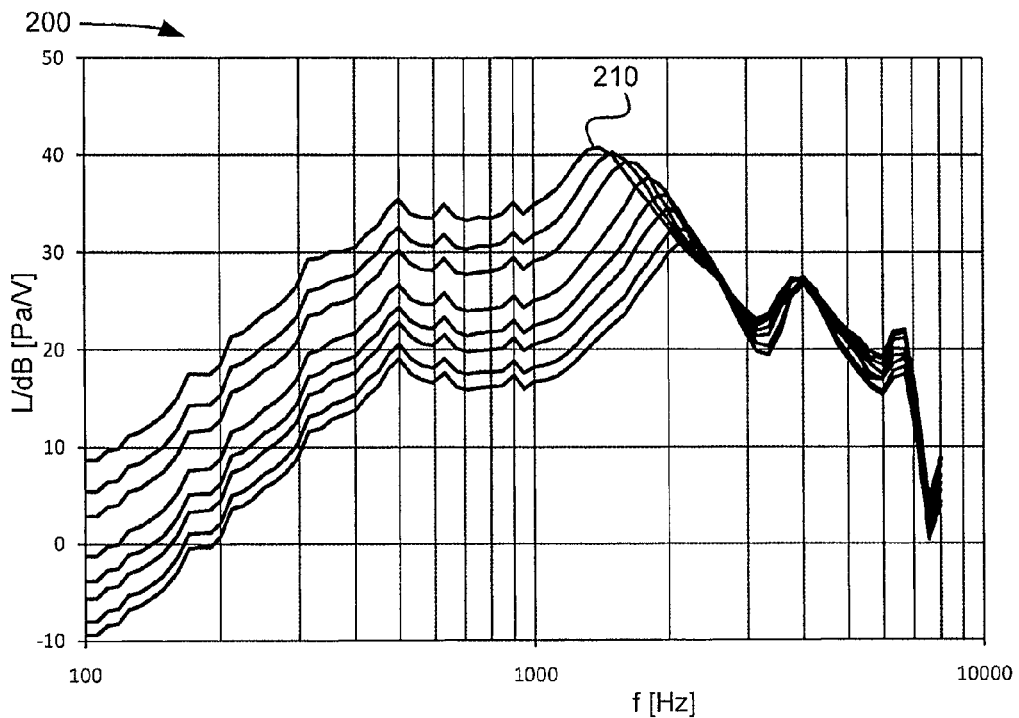
FIG. 5 is a plot showing transfer characteristics according to illustrative examples.

In FIG. 5, the transfer characteristic, in the form of a magnitude response, from the input voltage of the speaker 10 to the sound pressure in the ear 2a, as measured by an artificial ear for different degrees of leakage, is plotted vs. frequency (denoted f in FIG. 5) in a plot 200. The artificial ear used for the measurements conforms to the recommendation ITU-T P.57, type 3.3. Each curve in FIG. 5 corresponds to a given degree of leakage (denoted L in FIG. 5). It can be noted that there is a resonance peak in each of the curves plotted in FIG. 5 that appear in the frequency range of approximately 1 kHz-2.5 kHz. The resonance peak is identified with the reference numeral 210 for one of the curves. In the following text, the reference numeral 210 is used for the resonance peak in general, and not only for the particular curve for which it is used in FIG. 5. The occurrence of this resonance peak 210 can be qualitatively explained by that the air volume between the phone and the ear, basically the air volume of the concha cavity, acts as a compliance and the reactive part of the leak, basically the radiation impedance into free space, acts as an acoustic mass. It can be observed that above the resonance peak 210 (i.e. at higher frequencies), the curves are relatively close together, whereas below the resonance peak 210 (i.e. at lower frequencies), the curves are more separated. This is an illustration of what is qualitatively described above as that sound leakage affects lower frequencies to a larger extent than higher frequencies.

Figure 6:
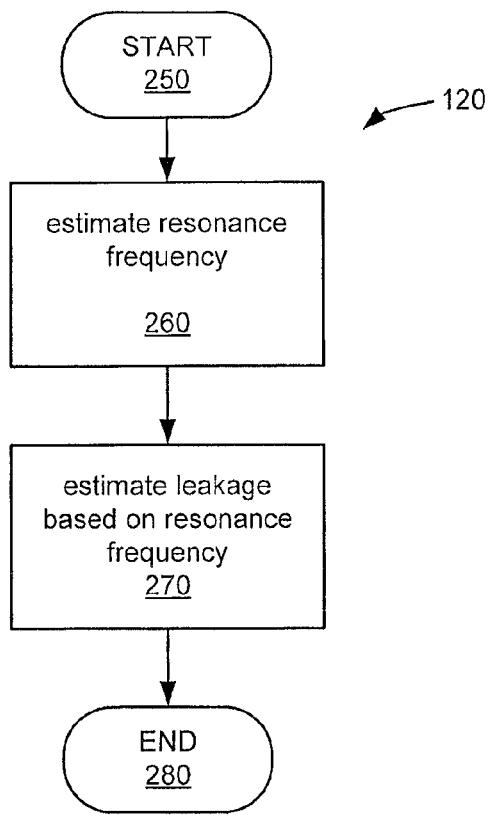
FIG. 6 is a flowchart of an embodiment of a step in the flowchart of FIG. 3.

It can be noted that, for different degrees of leakage, the resonance frequency (i.e. the frequency for which the resonance peak appear) is different. Normally, the larger the degree of leakage, the higher is the resonance frequency. This property may be utilized in embodiments of the present invention to estimate the degree of leakage based on the transfer characteristic. For example, step 120 (FIG. 3) may comprise estimating a resonance frequency of the sound pressure based on the transfer characteristic that is estimated in step 110 (FIG. 3). Furthermore, step 120 may comprise estimating the degree of leakage based on the estimated resonance frequency. This is illustrated in FIG. 6 with a flowchart of step 120 according to an embodiment. According to the embodiment, the operation of step 120 is started in step 250. In step 260, the resonance frequency is estimated. Furthermore, in step 270, the degree of leakage is estimated based on the estimated resonance frequency. The operation of step 120 is, according to the embodiment illustrated in FIG. 6, ended in step 280.

In some embodiments, the control unit 30 (FIG. 2) may accordingly be adapted to estimate a resonance frequency of the sound pressure based on the transfer characteristic and estimate the degree of leakage based on the resonance frequency.

How the adjustable filter 40 (FIG. 2) should be adjusted to compensate for a varying degree of leakage can e.g. be determined based on measurements. Such measurements may e.g. be performed using an artificial ear. Such an artificial ear may e.g. be of the type used for the measurements illustrated in FIG. 5. The measurement may be performed using a test signal. The test signal may be applied when the mobile phone 3 is held in a reference position and the adjustable filter 40 is in a default setting. The reference position may be a position where the mobile phone 3 is held at a position and application force to the artificial ear where the amount of leakage is relatively small (e.g. similar to the position illustrated in FIG. 1a). The resulting frequency distribution, in the following referred to as the reference frequency distribution, of the sound pressure (measured by the artificial ear) for the test signal may be measured for the reference position. Subsequently, measurements may be performed in different positions of the mobile phone 3, resulting in different degrees of leakage. For each degree of leakage, parameters of the adjustable filter 40 may be adjusted such that the resulting frequency distribution of the sound pressure (measured by the artificial ear) deviates from the reference frequency distribution only within a predetermined acceptable limit. Thereby, appropriate settings of the adjustable filter 40 for different degrees of leakage may be determined. As indicated by the plots in FIG. 5, the largest adjustments that need to be made to the transfer characteristic of the adjustable filter 40 normally concerns the response for frequencies below the resonance peak 210, whereas the transfer characteristic for higher frequencies may normally be left more or less unchanged.

Figure 7:
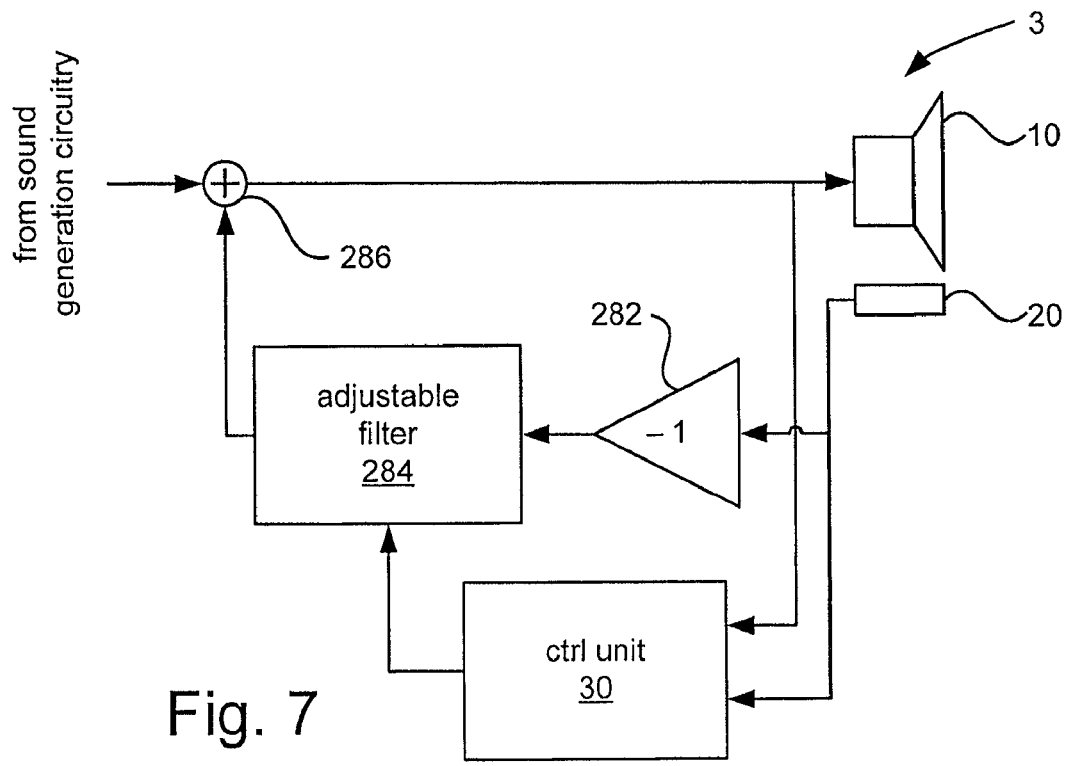
FIG. 7 is a block diagram of part of a portable communication device according to an embodiment of the present invention.

In addition to, or alternatively to, using the estimated leakage for adjusting the adjustable filter 40 (FIG. 2), the estimated leakage may be utilized in an ANC process, as discussed above with reference to FIG. 3. FIG. 7 is a block diagram of part of the mobile phone 3 provided with circuitry for performing a feed-forward ANC process. For this case, the at least one sensor 20 may be placed such that when the speaker 10 is held to the user's ear 2a, the at least one sensor 20 is located for sensing sound pressure of sound leakage from the cavity of the user's ear 2a, as described above in the context of FIG. 2. In the embodiment illustrated in FIG. 7, the mobile phone 3 comprises gain element 282 having a gain of −1 for changing the sign of the output signal from the sensor 20. In alternative embodiments, the gain of the gain element may be −K, where K is a positive number. Furthermore, the mobile phone 3 comprises an adjustable filter 284 for filtering the output signal from the gain element 282. Furthermore, the mobile phone 3 comprises an adder circuit 286 for adding the output signal of the adjustable filter 284 to a desired signal from sound generation circuitry of the mobile phone. The sound generation circuitry may include the sound signal source 50 (FIG. 2). The sound generation circuitry may additionally comprise the adjustable filter 40.

In addition to the sound pressure from sound leakage from the cavity of the user's ear, the sensor 20 picks up noise from surroundings (such as from vehicles, people, animals, etc) of the mobile phone 3. By means of the circuitry 282, 284, and 286, a filtered version of the noise picked up by the sensor 20 is subtracted from the desired sound signal in such a way that, as perceived by the user's ear 2a, the noise is cancelled or partially cancelled. In accordance with embodiments of the present invention, it has been realized that adjusting how the noise is filtered based on the estimated degree of sound leakage can improve the performance of the ANC process. Therefore, in the embodiment illustrated in FIG. 7, the control unit 30 is adapted to adjust the adjustable filter 284 based on the estimated degree of sound leakage. In a more general sense, embodiments of the mobile phone 3 may comprise ANC circuitry for subtracting a filtered version of the noise picked up by the sensor 20 from the desired sound signal, and the control unit 30 may be adapted to adjust said ANC circuitry based on the estimated degree of sound leakage.

How the adjustable filter 284 (or, more generally, the ANC circuitry) should be adjusted in response to a varying degree of leakage can e.g. be determined based on measurements. Such measurements may e.g. be performed using an artificial ear. Such an artificial ear may e.g. be of the type used for the measurements illustrated in FIG. 5.

Measurements may be performed for a number of different positions of the mobile phone 3, each resulting in a different degree of leakage. For each position, measurements may first be performed using a non-silent test signal from the sound generation circuitry for determining the degree of leakage. Thereafter, a silent test signal may be generated by the sound generation circuitry, and a test noise may at the same time be supplied from the surroundings of the mobile phone 3. Parameters of the adjustable filter 284 (or, more generally, the ANC circuitry) may be adjusted such that a metric, e.g. an RMS (Root Mean Square) value or a peak value in the time or frequency domain, of the noise pressure measured by the artificial ear is below a predetermined threshold value. Thereby, appropriate settings of the adjustable filter 284 (or, more generally, the ANC circuitry) for different degrees of leakage may be determined. Similarly to the adjustments of the adjustable filter 40 discussed above, the largest adjustments that need to be made to the transfer characteristic of the adjustable filter 284 normally concerns the response for frequencies below the resonance peak 210, whereas the transfer characteristic for higher frequencies may normally be left more or less unchanged.

Figure 8:
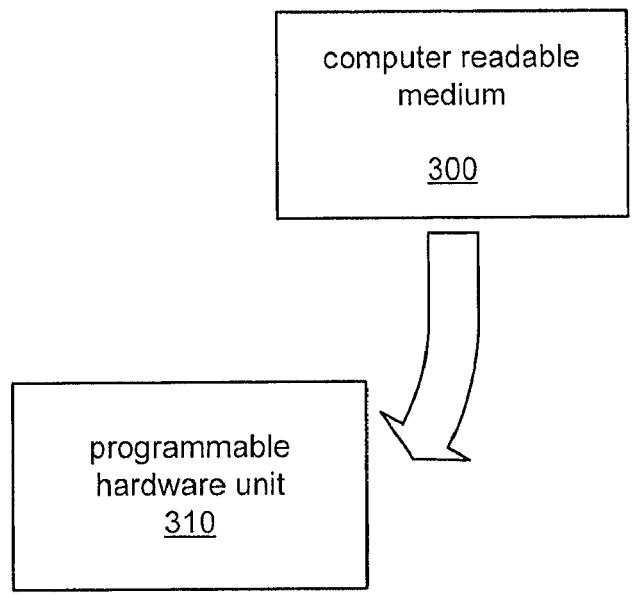
FIG. 8 schematically illustrates a computer readable medium and a programmable hardware unit.

The control unit 30 (FIGS. 2 and 7) may be implemented as an application-specific hardware unit. Alternatively, the control unit 30 or parts thereof may be implemented using one or more configurable or programmable hardware units, such as but not limited to one or more field-programmable gate arrays (FPGAs), processors, or microcontrollers. Hence, embodiments of the present invention may be embedded in a computer program product, which enables implementation of the method and functions described herein, e.g. the embodiments of the method described with reference to FIGS. 3, 4, and 6. Therefore, according to embodiments of the present invention, there is provided a computer program product, comprising instructions arranged to cause a programmable hardware unit with processing capabilities, such as the aforementioned one or more processors or micro controllers, to perform the steps of any of the embodiments of the method described with reference to FIGS. 3, 4, and 6. The computer program product may comprise program code which is stored on a computer readable medium 300, as illustrated in FIG. 8, which can be loaded and executed by a programmable hardware unit 310 having processing capabilities, to cause it to perform the steps of any of the embodiments of the method described with reference to FIGS. 3, 4, and 6.

The present invention has been described above with reference to specific embodiments. However, other embodiments than the above described are possible within the scope of the invention. Different method steps than those described above, performing the method by hardware or software, may be provided within the scope of the invention. The different features and steps of the embodiments may be combined in other combinations than those described. The scope of the invention is only limited by the appended patent claims.

The invention claimed is:

1. A portable communication device comprising:
    a speaker adapted to be held to an ear of a user for conveying sound to the user;
    at least one sensor for sensing sound emanating from said sound conveyed to the user; and
    a control unit adapted to:
        estimate, based on an electrical input signal supplied to an input port of the speaker and an electrical output signal received from an output port of the at least one sensor, a transfer characteristic from the input port of the speaker to the output port of the sensor;
        estimate, based on the estimated transfer characteristic, a frequency at which the transfer characteristic exhibits a resonance peak; and
        estimate, based on the estimated frequency, a degree of sound leakage from the user's ear.

2. The portable communication device according to claim 1, comprising:
    an adjustable filter for generating the electrical input signal to the speaker; wherein
    the control unit is adapted to adjust the adjustable filter based on the estimated degree of sound leakage for compensating a variation in the degree of sound leakage.

3. The portable communication device according to claim 1, wherein the at least one sensor is placed such that, when the speaker is held to the user's ear, the at least one sensor is located for sensing the sound of a cavity of the user's ear.

4. The portable communication device according to claim 1, wherein the at least one sensor is placed such that, when the speaker is held to the user's ear, the at least one sensor is located for sensing sound leaking from a cavity of the user's ear.

5. The portable communication device according to claim 1, wherein the control unit is adapted to:
    estimate a resonance frequency of the sensed sound based on the estimated frequency; and
    estimate said degree of sound leakage based on said resonance frequency of the sensed sound.

6. The portable communication device according to claim 1, wherein the control unit is adapted to estimate said transfer characteristic in the frequency domain.

7. The portable communication device according to claim 1, wherein the control unit is adapted to utilize said estimated degree of sound leakage as an input parameter of an active noise cancellation process.

8. The portable communication device according to claim 1, wherein the at least one sensor is a microphone.

9. A method of processing signals in a portable communication device comprising a speaker adapted to be held to an ear of a user for conveying sound to the user and at least one sensor for sensing sound emanating from said sound conveyed to the user, wherein the method comprises:
    estimating, based on an electrical input signal supplied to an input port of the speaker and an electrical output signal received from an output port of the at least one sensor, a transfer characteristic from the input port of the speaker to the output port of the sensor;
    estimating, based on the estimated transfer characteristic, a frequency at which the transfer characteristic exhibits a resonance peak; and
    estimating, based on the estimated frequency, a degree of sound leakage from the user's ear.

10. The method according to claim 9, wherein the portable communication device comprises an adjustable filter for generating the electrical input signal to the speaker, and the method comprises
    adjusting the adjustable filter based on the estimated degree of sound leakage for compensating a variation in the degree of sound leakage.

11. The method according to claim 9, wherein the at least one sensor is placed such that, when the speaker is held to the user's ear, the at least one sensor is located for sensing the sound of a cavity of the user's ear.

12. The method according to claim 9, wherein the at least one sensor is placed such that, when the speaker is held to the user's ear, the at least one sensor is located for sensing sound leaking from a cavity of the user's ear.

13. The method according to claim 9, wherein estimating the degree of sound leakage from the user's ear comprises:
    estimating a resonance frequency of the sound pressure based on the estimated frequency at which the transfer characteristic exhibits a resonance peak; and
    estimating the degree of sound leakage based on said resonance frequency of the sound pressure.

14. The method according to claim 9, wherein estimating said transfer characteristic comprises estimating the transfer characteristic in the frequency domain.

15. The method according to claim 9, comprising utilizing said estimated degree of sound leakage as an input parameter of an active noise cancellation process.

16. The method according to claim 9, wherein the at least one sensor is a microphone.

17. A computer program product comprising computer program code means contained in a non-transitory medium for executing the method according to claim 9 when said computer program code means are run by a programmable hardware unit.

18. A non-transitory computer readable medium having stored thereon a computer program product comprising computer program code means for executing the method according to claim 9 when said computer program code means are run by a programmable hardware unit.

19. A control unit for a portable communication device configured to perform the method according to claim 9.

* * * * *